United States Patent [19]
Risser, Jr.

[11] 3,863,806
[45] Feb. 4, 1975

[54] TURBINE METER
[76] Inventor: Ross Eugene Risser, Jr., Bonham, Tex.
[22] Filed: Oct. 9, 1973
[21] Appl. No.: 404,237

[52] U.S. Cl. .................................. 222/23, 73/229
[51] Int. Cl. .............................................. B67d 5/38
[58] Field of Search ....... 222/14, 17, 20, 23, 25–28, 222/71; 73/229

[56] References Cited
UNITED STATES PATENTS
| | | | |
|---|---|---|---|
| 3,130,870 | 4/1964 | Phillips et al. | 222/26 |
| 3,199,727 | 8/1965 | Romanowski | 222/32 X |
| 3,749,283 | 7/1973 | Nelson | 222/27 |

FOREIGN PATENTS OR APPLICATIONS
| | | | |
|---|---|---|---|
| 1,709 | 5/1874 | Great Britain | 73/229 |

Primary Examiner—Robert B. Reeves
Assistant Examiner—Joseph J. Rolla
Attorney, Agent, or Firm—Davis, McCaleb & Lucas

[57] ABSTRACT

Turbine meter device comprising a conical rotor with a plurality of spiral fluid passages tapered to increase the fluid flow velocity as it is directed spirally from the small end of the cone toward the large end of the cone along its tapered surface. The rotor rests on a seat. When fluid flows through the passages, a pressure drop occurs therein sufficient to lift the rotor from its seat and permit the rotor to rotate. If fluid flow is stopped, the rotor will return to its seat to prevent inertial coasting and thereby avoid inaccurate measurement of fluid flow. The turbine meter avoids the necessity to perform the function of separating air from the flow of fluid and utilizes electrical impulses in order to record the volume of fluid flow through the meter.

10 Claims, 4 Drawing Figures

TURBINE METER

BACKGROUND OF THE INVENTION

1. FIELD OF THE INVENTION

The present invention relates to a fluid meter of the type that is adapted to be used in automotive service station dispensing equipment and the like and more particularly to an improved construction and arrangement of turbine metering valves, valve operating means and electronic counting mechanism.

2. Description of the Prior Art

In the gasoline dispensing equipment commonly found in service stations, gasoline is pumped under pressure from a storage tank to a displacement meter which discharges into a pipe line leading to a flexible hose and nozzle used in such installations for conveying gasoline from the pipe line to the receptacle being filled. The displacement meter ordinarily includes a plurality of pistons reciprocated in cylinders by the pressure of the incoming gasoline and these cylinders discharge into ports and ducts communicating with a discharge passageway in the meter connected to the delivery pipe line of the system. A distributing valve driven by these pistons through the intermediary of a valve operating plate controls the flow of gasoline discharged from the cylinders in such a manner that the incoming gasoline exerts a driving force on the pistons in sequence so that the pistons are reciprocated and the valve-operating plate and valve are operated. Operation of these pistons forces gasoline into the discharge passageway of the meter and from this passageway into the delivery pipe line and the flexible hose and nozzle.

In one form of meter the distributing valve is driven by the pistons through the intermediary of a valve-operation plate, and the movable valve in turn is operatively connected to and drives a register device that visually indicates the volume of gasoline dispensed and quite frequently calculates the cost of the particular volume which has been dispensed.

Moreover, known meters provide a valve and valve operating plate that permits orbital movement of the valve and plate over the valve seat in a horizontal plane and also includes a crank arm, a driving disc engaging a portion of the crank arm, the disc being of such configuration to force the valve in orbital movement in order to measure the volume of fluid flow through the meter.

SUMMARY OF THE INVENTION

The present invention is concerned particularly with eliminating these parts and providing an improved metering apparatus aimed at producing a better and more accurate operation thereof over a protracted period of time.

Further the present invention provides a fluid meter having a conical rotor with a plurality of fluid passages adapted to increase exit velocity fluid flow and thereby cause a pressure drop in the meter that raises the rotor from a seat and provides for recordation of fluid flow by electrical impulse and avoids the need to separate air from fluid prior to introduction into or within the meter itself.

Accordingly, an object of the invention is the provision in a fluid meter of the type above mentioned of an improved construction of a valve metering arrangement using no seals whereby the valve provides for measurement of fluid without separation of air therefrom as contrasted with previous constructions wherein the valve and air separator are distinct individual component parts.

Another object of the invention is the provision of a new and improved fluid meter having a single-operating part adaptable to increase the velocity of fluid flow for measurement thereof and also ensure a positive cut-off of fluid flow measurement when the operating part ceases operation.

A further object of the invention is the provision of a new and improved fluid meter having means adapted to avoid separation of air from fluid, measure the flow of the fluid by acceleration thereof to obtain a desired exit velocity and utilize electrical impulses to record flow of fluid through the meter.

A still further object of the invention is the provision of a new and improved fluid meter having a conical rotor that avoids separation of air and measures fluid flow as contrasted with prior structure having a crank arm mounted on the distributing valve and a driving disc on the register driving mechanism engaging the crank arm pin, the disc being of such configuration that it forces the valve to travel over an orbital path throughout its cycle of operation and thereby prevents short stroking of the valve so that an accurate reading on the register of the volume of liquid flowing through the meter is obtained.

Yet another object of the invention is the provision of a new and improved fluid meter having a conical rotor with a plurality of fluid passages for increasing the velocity of fluid flow so constructed and arranged that the liability of wear on these parts is greatly reduced and as a result the meter remains accurate over protracted periods of use.

A further object of the invention is the provision in the construction of a fluid meter of this type of a rotor positioned in the housing thereof to cooperate with a rotor seat wherein fluid flow is measured only when the rotor is caused to be raised from its seat.

A further object of the invention is the provision of a fluid meter in which a number of parts have been eliminated and construction has been greatly simplified without in any way impairing wearing qualities or accuracy.

A further object of the invention is the provision of a new and improved fluid meter of simplified and improved construction and arrangement of parts that is inexpensive to manufacture but nevertheless sufficiently sturdy to withstand long periods of use without necessitating repair or major adjustment of the parts and which may be readily adjusted or dismantled for repair or replacement.

A further object of the invention is the provision of a metering valve having a surface cooperating with a valve seat in raised rotatable motion so that wear on the surfaces is negligible.

This invention is an improvement over the construction of the subject matter shown and described in my U.S. Pats. Nos. 2,616,293, issued Nov. 4, 1952, and 2,724,970, issued Nov. 29, 1955.

These and other objects of the invention will become apparent from the ensuing description, reference being had to the accompanying drawings, in which:

IN THE DRAWINGS

DESCRIPTION OF THE PREFERRED EMBODIMENT

Figure 1:
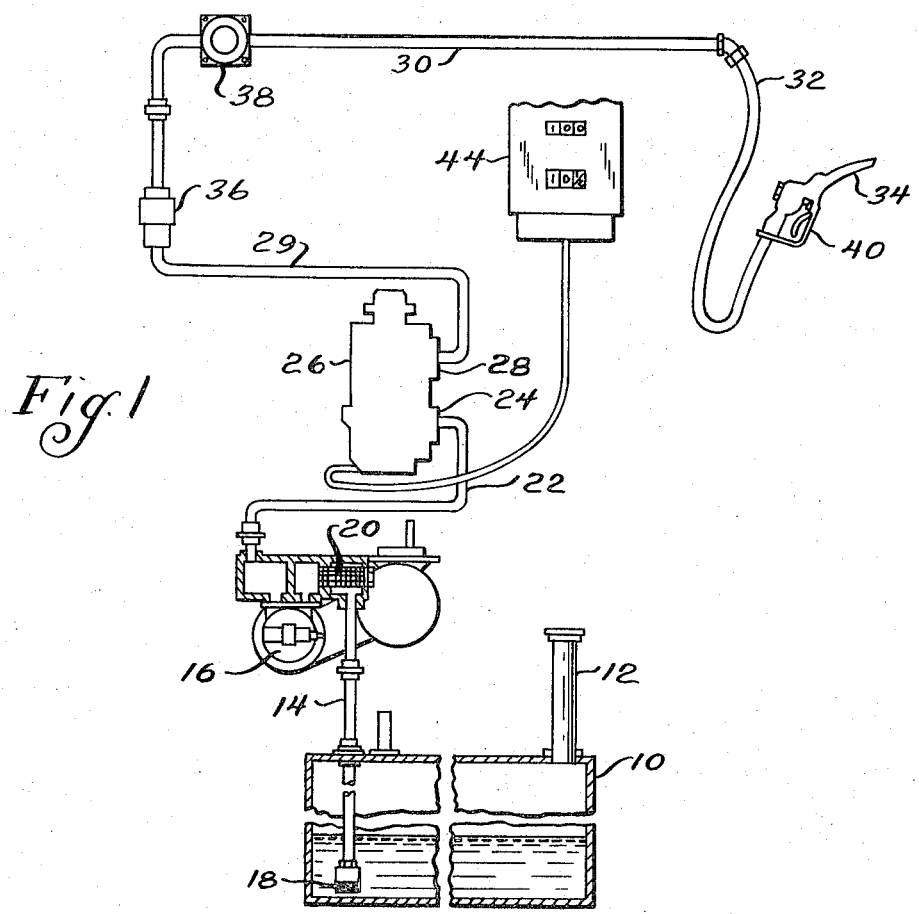
FIG. 1 is a diagrammatic representation of an arrangement of dispensing equipment particularly suitable for gasoline service stations.

Referring to FIG. 1, it will be noted that the dispensing equipment to which the meter of the present invention may be applied includes a subterranean gasoline storage tank 10 having a filling spout 12 through which the tank may be replenished; an outlet conduit 14 may extend upwardly from a point inside the tank adjacent the bottom, the conduit being connected to the inlet side of an electrically driven gear pump 16 which draws gasoline from the tank and forces it through the dispensing equipment. A foot valve 18 having a screened inlet is secured over the lower open end of the conduit 14 and a strainer 20 is secured adjacent the inlet chamber of pump 16 so that extraneous matter present in the gasoline in the storage tank may be excluded from the gear pump and the other parts of the dispensing equipment.

From the outlet chamber of the pump 16 gasoline is forced through a conduit 22 to an inlet 24 leading to a fuel meter housing 26. Gasoline is discharged from the meter housing 26 through an outlet 28 and a discharge pipe 29 at an upper end of the same, the pipe 29 being connected to a pipe line 30 which is in communication with a flexible hose 32 which has a nozzle 34 adapted to be introduced into the filling opening of a receptacle to be filled. The usual check valve 36 and visual flow indicator 38 are also provided, as is well known in the art.

The system herein disclosed is of the wet hose type so that it remains filled with gasoline at all times, and an immediate flow through the nozzle 34 may be obtained by opening the manually operated valve 40 associated therewith. The instant the valve 40 is opened, gasoline may flow from the nozzle 34 thus releasing the pressure in the system so that more gasoline is drawn by the pump 16 from the tank 10. From the outlet chamber of the pump the gasoline is forced through the conduit 22, into the metering housing 26. The meter mechanism, as will presently be described, is connected by means of electronic counting means hereinafter described in greater detail to a visual register device 44 which indicates to an observer the amount of gasoline which has been dispensed. This may also be provided with an indicator to show the cost of the amount of gasoline as is well known in the art.

Figure 2:
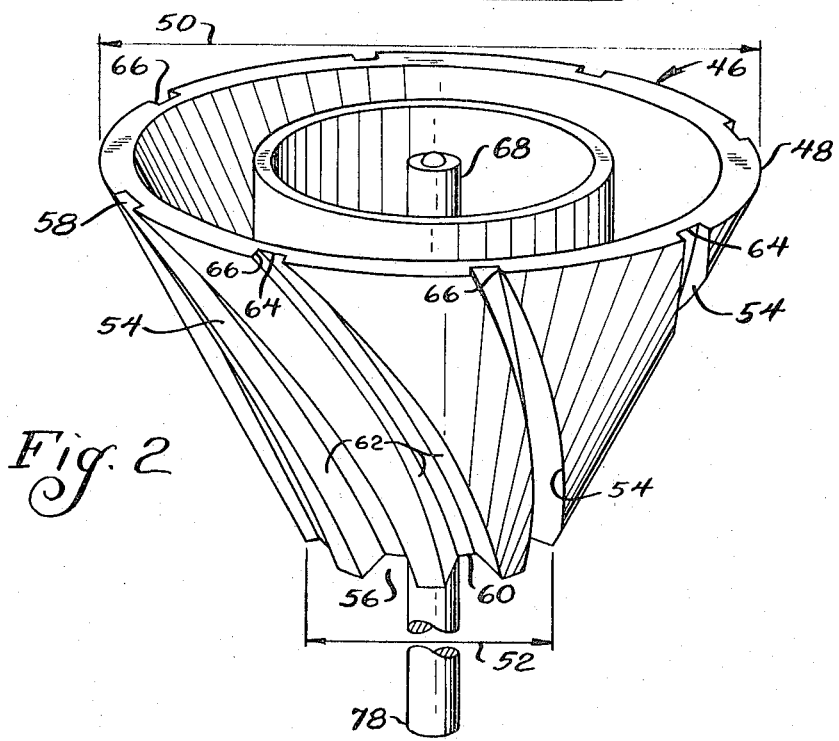
FIG. 2 is a perspective view of the fluid meter turbine rotor showing detailed specific construction, the same being removed from its housing and shown as a separate component part.
Figure 3:
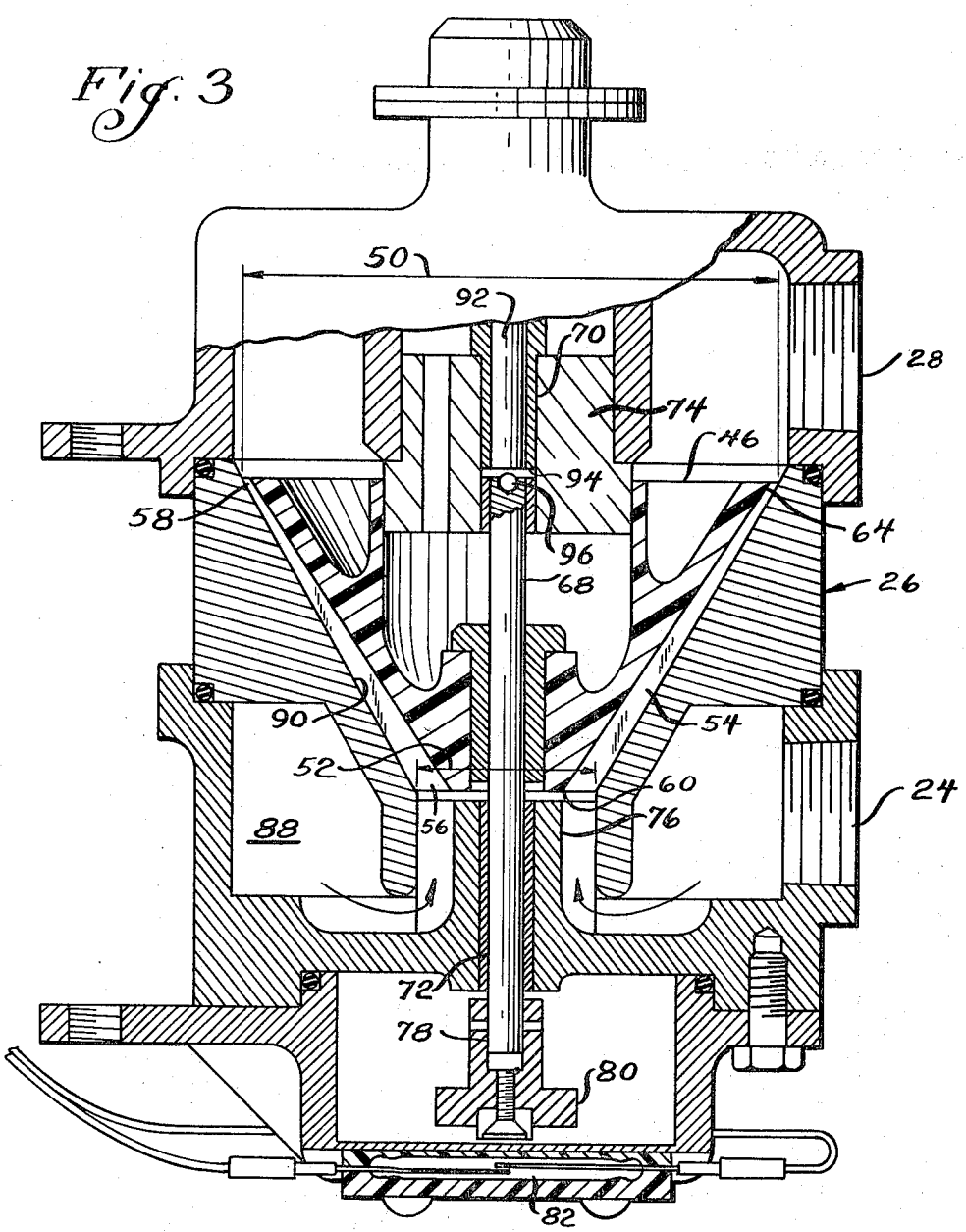
FIG. 3 is a vertical sectional view through the fluid meter with the rotor in raised operative position; a front portion of the housing broken away so that the working parts may be more clearly seen.

Referring now to FIGS. 2 and 3, the turbine meter housing 26 has disposed therein a turbine meter assembly 46. The turbine meter is shaped to form a conical rotor 48 having a first diameter 50 greater than a second diameter 52. It can be seen that the turbine meter resembles a truncated cone-shaped member. The conical rotor has formed therein a plurality of spiral tapered grooves 54. The grooves are disposed on the outer peripheral surface of the rotor 48 and have inlet 56 and outlet 58 openings formed, respectively, in the horizontal planes of the second and first diameters of the rotor.

When viewed in cross section, it can be seen that inlet openings 56 are shaped with three surfaces; namely, an inner circumferential portion 60, and two side portions 62 that diverge radially outwardly from the inner circumferential portion 60. Similarly, when viewed in cross section, outlet openings 58 are shaped with three surfaces; namely, an intermediate circumferential portion 64 and two side portions 66 that diverge radially outwardly from the intermediate circumferential portion.

It should be noted that the cross sectional area of inlet opening 56 is greater than the outlet opening 58 of each groove. Thus, it should be observed that the cross sectional area of each groove is formed to provide a tapered configuration that is regular and uniform throughout its spiral length.

The rotor is secured to and disposed about a shaft 68 rotatably journaled in top 70 and bottom 72 bearings secured in top 74 and bottom 76 bearing support members of the housing 26. A bottom portion 78 of the shaft 68 is keyed or otherwise affixed to a rotatable wheel member 80 so that each revolution of the rotatable member coincides with each revolution of the shaft.

It should be noted that the construction of rotor 48 is of a type that develops little torque during rotation thereof. Thus, as the rotor turns in housing 26 there is insufficient generation of torque to impart turning force to a mechanical registering device such as is well known in the prior art. Accordingly, in order to accurately measure flow of fluid, it is preferred to provide an electronic means for converting mechanical rotation into electrical impulses for feeding into visual register 44 and showing thereon volume of delivered fuel. The rotatable wheel member 80 is adaptable to be magnetized for inducing electrical impulses to be transmitted to a receiving means so that each mechanical rotation of the rotor is transformed into electrical impulses that may be received and recorded by visual register 44.

To accomplish the reception and recordation of electrical impulses, electronic counting means 82 (FIG. 3) is located adjacent to wheel member 80. Counting means 82 is shown as a so-called reed switch but it should be understood that any similar type mechanical electrical device might be utilized to accomplish the desired result. Counting means 82 is electrically connected by suitable means as is well known in the art to visual register 44.

In the preferred embodiment, rotor 48 is adaptable by preselected calculation of associative factors such as number, depth and length of grooves, spiral configuration thereof, distance of raise of the rotor from its seat during operation, and the like, to deliver one gallon of fluid for each 50 revolutions. Using the reed switch counting means 82, magnetized wheel member 80 will induce two electrical impulses per revolution of rotor 48. Thus, counting means 82 transmits to visual register 44 one hundred electrical impulses for every one gallon of fluid delivered and this information is duly transformed, as is well known in the art, into total gallons delivered as shown on the visual register.

Figure 4:
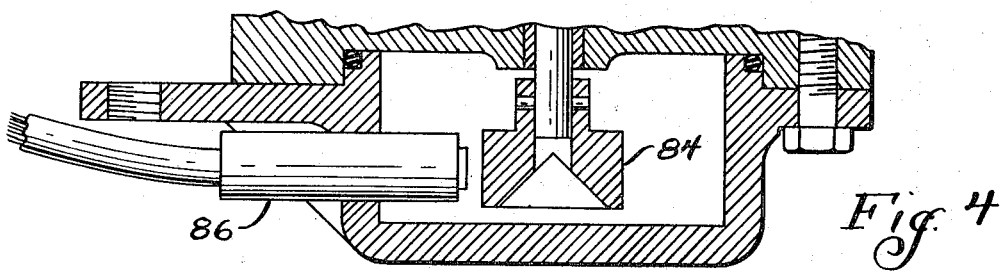
FIG. 4 is a vertical sectional view of a bottom portion of the fluid meter showing an alternate form for accomplishing recordation of electrical impulses.

An alternative means to effect reception and recordation of rotative motion is shown in FIG. 4. An optic wheel member 84 is keyed or otherwise affixed to the bottom portion 78 of shaft 68 so that each revolution of the optic wheel member 84 coincides with each revolution of the shaft. The optic wheel 84 is adapted to induce an optic impulse to be transmitted and received by appropriate means so that each mechanical rotation of the rotor is transformed into impulses that may be received and recorded by visual register 44 in a manner similar to that heretofore described in connection with magnetized wheel member 80 and reed switch 82.

To receive optic impulses generated by the rotation of optic wheel 84, a photoelectric cell 86 is disposed adjacent the wheel 84. Cell 86 receives optic impulses from each revolution of rotor 48 and transmits by known fiber optic technique this information to visual register 44. Since cell 86 receives two optic impulses for each revolution of rotor 48, and the rotor turns fifty times to deliver a gallon of fluid as hereinbefore described, it can be seen that visual register 44 must be adapted in a known manner to show a gallon of delivered fluid for each 100 optic impulses received from fifty revolutions of rotor 48.

Experience has shown that rotor 48 delivers 1 to 15 gallons per minute at a pressure drop of about four pounds between the inlet 24 and the outlet 28 of housing 26 at an accuracy of 2 cubic inches in every 1,155 cubic inches of delivered fluid.

It should be noted the aforementioned accuracy of fluid flow measurement attainable by the device of the present invention equals or exceeds those standards set up by the National Bureau of Standards of the United States.

In the operation of the present invention, pump 16 forces fluid into housing 26 through inlet 24. The fluid flows into a chamber 88 and as pressure builds up therein, pressure is exerted against the bottom surfaces of the rotor 48. The pressure of the fluid in being urged against rotor 48 reacts into components of force in grooves 54. These components of force are rectilinear in direction but due to the spiral construction of the grooves, they are channeled therein and cause the rotor to turn. As the fluid flows through the tapered length of each groove, it picks up velocity and exits as a jet force from the smaller end of the tapered groove. This jet force is resolved into tangential components of force that cause the rotor to rise up in the housing, turn and subsequently permit a predetermined amount of fluid to flow with each revolution of the rotor and thereby measure the volume of fluid flow. The preferred embodiment utilizes a total of eight grooves formed in a cone-shaped surface so that distribution is effected evenly between inlet and outlet of the housing. Thus, fluid flow accelerates as it flows through the tapered grooves, in a smooth manner to achieve the desired exit jet velocity and thereby raise, turn the rotor and measure accurately the volume of fluid delivered to a receptacle.

In order to regulate the distance that rotor 48 is permitted to rise from a cooperating seat 90 formed in housing 26, adjustment means 92 is disposed within a portion of top bearing 70 and extends exteriorly of the housing 26. A bottom end 94 of adjustment means 92 is set a preselected distance above a ball 96 rotatably secured in a recess of the top end of shaft 68. When rotor 48 is induced to revolve at a rate sufficient to deliver a desired volume of fluid flow, the rotor rises from seat 90 until ball 96 achieves point contact with the bottom end 94 of adjustment means 92. Adjustment means 92 is preferably shaped with threads and a known locking arrangement to form a screw or the like received by complementary threads formed in the housing. Thus, it can be understood that adjustment means 92 can be moved to any preselected position and maintained thereat to permit any desired vertical displacement of rotor 48 from its cooperating seat 90.

It should be understood that when fluid is stopped from flowing through the grooves 54 of rotor 48, as by closing valve 40 and thereby shutting off the fluid delivered through the nozzle 34, the rotor 48 will cease revolving and settle or drop into frictional engagement with its cooperating seat 90 of the housing. Thus, rotor 48 will not turn unless fluid is being delivered to a receptacle. Accordingly, in this manner a highly accurate measurement of delivered fluid volume is thereby accomplished by the turbine meter of the present invention.

It should be further observed that the presence of air in the fluid pumped from the storage tank through the meter to a receptacle does not affect the accuracy of measurement of fluid flow. Usually, the amount of air entrained in the fluid is in the form of small bubbles and as carried along with the fluid through the meter is negligible in comparison with the mass of fluid causing the rotor to rise from its seat and revolve in the housing. In the event only air and no fluid flows into the meter there will be insufficient mass of energy to cause the rotor to raise from its seat and revolve in the housing. In this situation, of course, no fluid is delivered to a receptacle and therefore no electrical impulses will be received by the fluid register to record the volume of delivered fuel.

As soon as air is purged through the meter and system into a receptacle, fluid will flow and its mass of energy will be urged against the rotor to cause it to raise and revolve and thereby measure the volume of delivered fuel. Accordingly, a principal advantage of the present invention resides in the containment of fuel vapor completely within fuel dispensing equipment, so that air pollutants that may be present in the fuel vapor are not released to the atmosphere.

While I have illustrated and described a specific embodiment of my invention it will be apparent to those skilled in the art that changes and modifications may be made in the exact details shown, and I do not wish to be limited in any particular; rather, what I desire to secure and protect by Letters Patent of the United States is:

I claim:

1. In fuel dispensing equipment including storage means for confinement of a supply of fuel, hose and nozzle means for discharging said fuel into a receptacle, pump means connected to the storage means for forcing said fuel under pressure to said nozzle means, and fuel register means; fuel meter means connected between said pump and nozzle means and operable to actuate said fuel register means comprising: a housing having an inlet receiving fuel from said pump means and an outlet discharging fuel to said nozzle means; a turbine rotor mounted on a shaft journaled in said housing, a seat formed in said housing, said rotor having a configuration shaped to cooperate with said seat of said housing, said rotor having a plurality of tapered spiral grooves formed in a peripheral surface thereof; and electrical means disposed adjacent said rotor for counting and sending to said register means the number of revolutions of the rotor; said fuel in being pumped through the grooves of the meter means being effective to raise the rotor from the seat of the housing, revolve said rotor therein and thereby measure the volume of fuel dispensed from said nozzle.

2. Fuel meter means as claimed in claim 1 wherein said electrical means comprises, magnet means secured to the shaft of the rotor for coincidental rotation therewith, and reed switch means disposed adjacent said magnet means for creating a predetermined number of electrical impulses per revolution of the rotor for transmission to the register means.

3. Fuel meter means as claimed in claim 1 wherein said electrical means comprises, optic wheel means secured to the shaft of the rotor for coincidental rotation therewith, and optic sensing means disposed adjacent said optic wheel means for creating a predetermined number of electrical impulses per revolution of the rotor for transmission to the register means.

4. Fuel dispensing equipment as claimed in claim 1 comprising: adjustment means disposed in the housing for at times maintaining contact with one end of the shaft, said adjustment means being effective to control the distance the rotor may raise from the seat of the housing.

5. A fluid meter comprising: a housing having inlet and outlet openings; and turbine rotor means rotatably journaled within said housing and having an oblique exterior surface adaptable to cooperate with and at times seat upon a complementary oblique surface of said housing, said rotor having a plurality of tapered spiral grooves formed in its said oblique surface adaptable to receive fluid for flow therethrough, said fluid upon flowing through said grooves effective to establish a jet velocity sufficient to rotate and raise the rotor from the oblique surface of the housing and thereby measure a finite volume of flow through the housing.

6. A fluid meter as claimed in claim 5 further comprising, said rotor means being shaped as a truncated cone member having a first diameter greater than a second diameter, said tapered spiral grooves having an inlet cross sectional area formed in the plane of said second diameter and an outlet cross sectional area formed in the plane of said first diameter, said inlet cross sectional area of said grooves being greater than said outlet cross sectional area so that flow of fluid through the grooves increases in velocity between inlet and outlet thereof.

7. A fluid meter as claimed in claim 5 comprising; adjustment means disposed in said housing for at times maintaining contact with said turbine rotor means, said adjustment means being effective to control the distance the rotor is permitted to raise from the oblique surface of the housing.

8. A fluid meter as claimed in claim 5 comprising; electrical means disposed adjacent the rotor for creating electrical impulses generated by each revolution of the rotor, and register means connected to said electrical means for converting said electrical impulses into said measurement of fluid flow through the housing.

9. A fluid meter as claimed in claim 8 wherein said electrical means comprises: magnet means secured to said turbine rotor means for coincidental rotation therewith, and reed switch means disposed adjacent said magnet means for creating said electrical impulses for transmission to the register means.

10. A fluid meter as claimed in claim 8 wherein said electrical means comprises: optic wheel means secured to said turbine rotor means for coincidental rotation therewith, and optic sensing means disposed adjacent said optic wheel means for creating said electrical impulse for transmission to the register means.

* * * * *